Dec. 16, 1958     F. N. ROTHACKER     2,864,756
METHOD AND APPARATUS FOR THE TREATMENT OF PLASTIC MATERIALS
Filed June 8, 1955
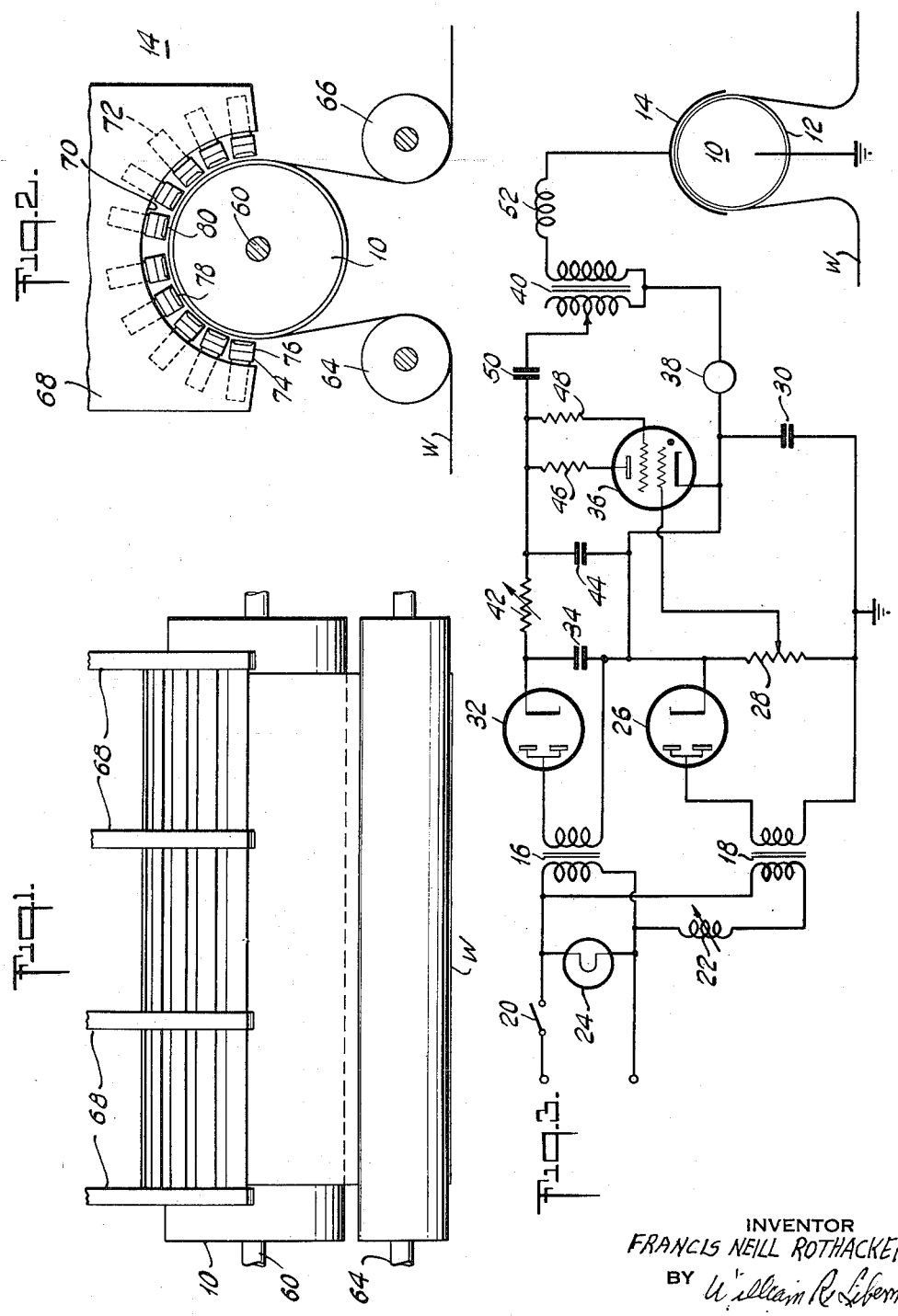
INVENTOR
FRANCIS NEILL ROTHACKER
BY William R. Liberman
ATTORNEY

United States Patent Office 2,864,756
Patented Dec. 16, 1958

2,864,756

METHOD AND APPARATUS FOR THE TREATMENT OF PLASTIC MATERIALS

Francis Neill Rothacker, East Orange, N. J., assignor to Modern Plastic Machinery Corp., Lodi, N. J., a corporation of Delaware Application June 8, 1955, Serial No. 513,968

12 Claims. (Cl. 204—168)

The present invention relates generally to an improved method and apparatus for the treatment of materials to alter the characteristics thereof, and in particular it relates more to an improved method and apparatus for treating an organic plastic material to increase the adhesive properties thereof and to render its surface suitable for the reception of coatings or copy by printing and other processes.

Many organic plastic materials, such as polyethylene for example, are extremely difficult to print since the surface of the untreated plastic has a low adherency to and compatibility with the conventional inks and other substances which it is often desired to apply thereto. As a consequence, the ink or other substance applied to these plastic surfaces readily wipe or peel off and the results are completely unsatisfactory. There have been proposed and employed many methods to alter the surface characteristics of these plastics to render them receptive, adherent to and compatible with the conventional inks and coatings employed therewith. These processes have been of a chemical, electrical and radiant nature, but have heretofore possessed numerous drawbacks and disadvantages. The chemical treatment of the plastic is expensive and time-consuming and requires considerable equipment. It has been proposed to pass the plastic web, in the case of polyethylene, through or in confrontation with a gas flame to improve its ink reception properties. This method is, however, difficult to control and results in high losses. The electrical methods proposed have been likewise inefficient, difficult to control and result in products of low uniformity.

It is thus a principal object of the present invention to provide an improved method and apparatus for the treatment of material to alter the characteristics thereof.

Another object of the present invention is to provide an improved method and apparatus for the treatment of the surface of an organic plastic material to improve the printing and coating properties thereof.

Still another object of the present invention is to provide an improved method and apparatus for the treatment of the surface of an advancing web of organic material to improve the printing and coating properties thereof.

A further object of the present invention is to provide an improved method and apparatus for treating the surface of an advancing web of polyethylene to alter the characteristics thereof.

Still a further object of the present invention is to provide an improved method and apparatus for treating the surface of an advancing web of polyethylene to alter the characteristics thereof, which method and apparatus are simple, inexpensive and rapid.

Another object of the present invention is to provide an improved method and apparatus for treating the surface of an advancing web of polyethylene to alter the characteristics thereof, the speed and depth of treatment and the resulting properties of the polyethylene being simply adjustable.

The above and other objects of the present invention will become apparent from a reading of the following description taken in conjunction with the accompanying drawings wherein:

Figure 1 is a front elevational view, partially broken away, of an electrode system and a web advancing mechanism which may be employed in practicing the subject invention;

Figure 2 is a side elevational view thereof; and

Figure 3 is a circuit diagram of an improved network which may be used in practicing the present invention.

In a sense, the present invention contemplates the provision of an improved method of treating an organic plastic material comprising the steps of establishing at a surface of said material a D. C. electric field and alternatively varying the intensity of said electric field between points below and above the gaseous discharge point of the ambient atmosphere adjacent to said material surface. The apparatus for practicing this method includes a pair of electrodes between which a web of the material to be treated is continuously advanced. A source of D. C. voltage connected in series with the source of A. C. voltage is connected between the electrodes and the A. C. voltage is adjusted so that the field established at the surface of the web varies between points above and below the gaseous discharge point of the atmosphere of the surface of the web.

Referring now to the drawings and more particularly to Figure 3 thereof which illustrates a preferred embodiment of an apparatus in accordance with the present invention, the numeral 10 generally designates a cylindrical electrode in the form of a drum by way of which a plastic web W may be continuously advanced. The surface of the electrode 10 is coated with a thin layer 12 of a suitable low-loss dielectric material of a thickness sufficient to inhibit the penetration or electrical breakdown thereof. Examples of such dielectric material are polytetrafluoroethylene, polymonochlorotrifluoroethylene and Mylar polyester resin which is a product of the Du Pont plastic division. Cooperating with the drum electrode 10 is a second arcuate electrode 14 confronting the surface of the electrode 10 and concentric therewith, the electrode 14 extending for substantially 180° and for slightly less than the width of the electrode 10. The spacing between the electrode 14 and the electrode 10 is adjustable and is preferably between ¼ inch and ⅛ inch, for example ³⁄₁₆ inch. The preferred structure of the electrode 14 will be hereinafter described.

The circuit network for establishing the desired electric field between the electrodes 10 and 14 includes a pair of power transformers 16 and 18 respectively, the primary of the transformer 16 being connected to a suitable source of A. C. current through a switch 20 and the primary of the transformer 18 being likewise connected to a source of A. C. current through the switch 20 by way of an adjustable inductor 22 which is connected in series with the primary of the transformer 18. A suitable lamp 24 is connected across the transformer primaries to indicate when they are energized.

The secondary of the transformer 18 has its lower terminal grounded and its upper terminal connected to the anode of a rectifying diode 26. The cathode of the diode 26 is grounded through the resistance element of a high resistance potentiometer 28 and is connected to the upper terminal of a filter condenser 30, the lower terminal of which is connected to ground. The terminals of the filtering condenser 30 define the positive and negative poles of a high voltage power supply having a variable potential in accordance with the adjustment of the variable inductance 22. The secondary of the transformer 16 has one terminal thereof connected to the anode of a rectifying diode 32 and the other terminal thereof connected to the lower terminal of a filter condenser 34 the upper terminal of which is connected to the cathode of the diode 32. The terminals of the filter condenser 34 define the positive and negative poles of a second power supply, the negative pole of which is connected to the positive pole of the condenser 30, to the cathode of a grid-controlled gas discharge tube 36, and through a milliammeter 38 to the lower joined ends of the primary and secondary of a tapped modulation transformer 40.

The cathode of the rectifying diode 32 is connected through a series-joined rheostat 42 and condenser 44 to the cathode of the gas tube 36, the rheostat 42 and the capacitor 44 forming the RC network of a relaxation oscillator including the gas discharge tube 36. The frequency of oscillation may be adjusted by varying the rheostat 42, the frequency depending primarily on the time constant of the RC network 42—44 and the characteristics of the gas tube 36. The anode of the gas discharge tube 36 is connected to the junction point of the resistor 42 and capacitor 44 by way of a current-limiting resistor 46 as is the second grid of the tube 36 through a resistor 48. The control grid of the gas discharge tube 36 is connected to the arm of the potentiometer 28 to permit the adjustment of the bias of the tube 36 and hence the firing potential thereof whereby primarily to control the amplitude of the output of the relaxation oscillator and consequently the frequency thereof. The output of the relaxation oscillator, as taken from the junction point of the rheostat 42 and capacitor 44, is connected by way of a coupling condenser 50 to a tap on the primary of the modulation transformer 40. The upper end of the secondary of the modulation transformer 40 is connected by way of an R. F. choke 52 to the treating electrode 14. Thus the field established at the surface of the web W passing between the electrodes 10 and 14 consists of a D. C. field as derived from the high voltage power supply including the diode 26 and an added alternating field as derived from the relaxation oscillator including the gas discharge tube 36. This cumlative field is effected by way of the modulation transformer 40 which is connected to the high end of the high voltage supply, the upper terminal of the modulation transformer 40 being connected to the electrode 14 and the lower end of the high voltage power supply being connected to the electrode 10 by way of ground.

In operation, the web W is continuously advanced around and in contact with the electrode 10 which is a rotating drum and the power applied to the circuit network by closing the switch 20. The potentiometer 28 is adjusted so as to supply a high negative bias to the gas discharge tube 36 thereby preventing the oscillation thereof and the auto transformer 22 is adjusted until a gaseous discharge is effected between the electrodes 10 and 14 in the atmosphere between the outer surface of the web W and the confronting surface of the electrode 14. The discharge is evidenced by a rapid rise in current as indicated on the milliammeter 38. Thereafter, the adjustable inductor 22 is backed down to a point slightly below that necessary to effect a gaseous discharge between the electrodes 10 and 14. The potentiometer 28 is then adjusted to a point where the relaxation oscillator becomes operative, the frequency of oscillation being adjusted by the rheostat 42 and the amplitude being adjusted by the potentiometer 28. The current passing between the electrodes 10 and 14, as evidenced by the meter 38, is an indication of the intensity of the treatment. The depth and speed of treatment are adjustable by the potentiometer 28 and the rheostat 42 respectively. Thus when the web is advanced at a high speed the resistance of the rheostat 42 is reduced to increase the frequency of the relaxation oscillator and where a greater depth of treatment is desired the negative bias on the gas discharge tube 36 is increased to thereby increase the amplitude of the output of the relaxation oscillator. It has been found that in addition to the D. C. field and the added alternating field there is experienced between the electrode 10 and 14 an oscillation of greater frequency which is present during the gaseous discharge period between the electrodes 10 and 14. This oscillation is a combination of various frequencies and is determined by the values of the various components including principally the inductance of the R. F. choke 52 and the capacitance of the electrodes 10 and 14. It should be pointed out that only one face of the web W is exposed to the gaseous discharge since it is desired to treat this face only. However, both faces may be exposed and thus treated.

As an example of the application of the improved method and apparatus, a web W of polyethylene of any desired width, for example, between 24 inches and 100 inches is advanced between the electrodes 10 and 14 at a rate of between 600 feet and 700 feet per minute. The diameter of the electrode 10 is approximately 8 inches and the distance between electrode 14 and the confronting surface of the web W is approximately 3/16 inch. The dielectric covering 12 on the electrode 10 has been found satisfactory at a thickness of about 15 mils. The D. C. voltage, as applied between the electrodes 10 and 14 and as measured across the condenser 30, is adjustable by means of the variable inductor 22 within a range of 3,000 volts to 4,000 volts, the gas discharge between the electrodes occurring within approximately the mid-point of this range. It should be noted that the transformer 18 is preferably tapped so that various interelectrode distances may be accommodated. The frequency range of the relaxation oscillator should be adjustable from approximately 400 cycles per second to several thousand cycles per second, for example, from 1,000 cycles to 3,000 cycles per second, whereas the amplitude of the alternating component of the field between the electrodes 10 and 14, as measured across the secondary of the transformer 40, is between 800 volts and 2,400 volts. It should be noted that the transformer 40 is likewise multi-tapped on the primary and secondary so as to greatly increase the range of the superimposed alternating field. The oscillation frequency, which is established between the electrodes 10 and 14 during the gaseous discharge therebetween, is a spectrum of frequencies between 2,000 cycles and 50,000 cycles per second. Excellent treatment of the surface of the polyethylene web can be realized within the above ranges and as a specific example, a web travelling at 600 feet per minute has surface properties imparted thereto highly receptive to printing where the D. C. field between the electrodes 10 and 14 is approximately 3,500 volts, the relaxation oscillator frequency is approximately 2,000 cycles per second, the superimposed alternating voltage is about 1,800 volts peak to peak and the oscillation frequency as above set forth. It should be pointed out that the various components are selected and the variables adjusted so that the field at the surface of the web is above the gaseous discharge point a majority of the time and preferably in excess of 75% of the time for example, 95% of the total treating time.

A preferred form of electrode system is illustrated in Figures 1 and 2 of the drawing, the drum electrode 10 being rotatably carried on a shaft 60 and freely rotatable guide rolls 64 and 66 carried on corresponding shafts are located directly below the electrode 10, their common tangents being inwardly inclined. Thus, the web W is directed along the lower, inner surface of the roller 64 about the electrode 10 and along the lower, inner surface of the roller 66 and continuously advanced in this fashion. The electrode 14 includes a plurality of longitudinally spaced insulating plates 68 having a semi-circular recess 70 formed therein which is concentric with the electrode 10 and carrying a plurality of peripherally spaced support members 72. Each of the support members 72 is provided with a pair of upper and lower cooperating jaw elements 74 and 76 respectively, the jaw element 76 having a longitudinally extending channel-shaped groove 78 formed in the face thereof confronting the electrode 10. A longitudinally extending strip 80 of a screen or grid material formed of metal or other suitable conductor and defining an electrode element is carried by each longitudinally extending set of support members 72, the strip 80 being disposed along the underface of the jaw elements 76 and being folded over along the sides of the respective elements and being engaged between the jaws 76 and 78. Each of the support elements 72 is adjustable so as to permit the varying of the spacing between the electrode elements 80 and the confronting surface of the drum electrode 10. The electrode elements 80 are electrically connected. An advantage of this structure is the reduction of the interelectrode capacitude between the electrodes 10 and 14 while maintaining a large discharge surface so as to increase the resonant frequency effected between the electrodes during the gaseous discharge. Another advantage of the improved electrode structure is the accompanying improvement in air circulation and the attendant reduction and inhibition of undesirable sparking. The electrode system and the web advancing mechanism are preferably located under a ventilating hood or in a ventilating closure so as to permit the removal of any ozone which may be generated during the process.

It should be noted that the values of the various components forming the circuit may be adjusted in accordance with the desired conditions as set forth above in a manner well-known in the art.

While there has been described and illustrated preferred embodiments of the present invention, it is apparent that numerous alterations and omissions may be made without departing from the spirit thereof. For example, while the treatment of the web has been indicated as effected prior to the printing or coating thereof such treatment may be effected subsequent to the printing or coating.

I claim:

1. The improved method of treating a polyethylene material, comprising the steps of establishing at a surface of said material a D. C. electric field and alternately varying the intensity of said electric field between points below and above the gaseous discharge point of the ambient atmosphere adjacent to said material surface.

2. The improved method in accordance with claim 1 including the step of impressing an additional oscillating field on said varying D. C. field when said D. C. field reaches substantially said gaseous discharge point, said oscillating field being of a frequency greater than the rate of alternation of said D. C. field.

3. The improved method in accordance with claim 1, wherein said electric field is substantially perpendicular to the surface of said material.

4. The improved method in accordance with claim 1, wherein said D. C. electric field is normally below the gaseous discharge point of said ambient atmosphere and said field is alternately increased by adding thereto a varying electric field of a strength sufficient to periodically raise said field to above the gaseous discharge point of said ambient atmosphere.

5. The improved method in accordance with claim 1, wherein the frequency of variation of the intensity of said electric field below and above the gaseous discharge point is in excess of 400 cycles per second.

6. The improved method in accordance with claim 1, including the step of impressing an additional oscillating field on said varying D. C. field when said field reaches substantially said gaseous discharge point, said oscillating field being of frequencies between 2,000 cycles and 50,000 cycles per second.

7. The improved method in accordance with claim 1, wherein said electric field is above said gaseous discharge point at least 50% of the time.

8. An improved apparatus for the treatment of a plastic material, comprising a pair of electrodes, means for conveying an organic plastic material between said electrodes, a source of A. C. voltage, a source of D. C. voltage connected in series with said source of A. C. voltage, said series-connected voltage sources being coupled between said electrodes and being of a value to alternately vary the field between said electrodes between points below and above the electric gaseous discharge points of the ambient atmosphere between said electrodes.

9. The improved apparatus in accordance with claim 8, wherein one of the terminals of said series-connected voltage sources is coupled to one of said electrodes through an inductance.

10. The improved apparatus in accordance with claim 9, wherein the resonant frequency of said inductance and said electrodes is between 2,000 cycles and 50,000 cycles per second.

11. The improved apparatus in accordance with claim 8, wherein one of said electrodes is a rotatable drum formed of a conducting material, the peripheral surface of said drum having an insulating coating thereon.

12. The improved apparatus in accordance with claim 8, wherein one of said electrodes includes a plurality of strips of perforated material.

References Cited in the file of this patent

UNITED STATES PATENTS

| 2,593,616 | Schroeder et al. | Apr. 22, 1952 |
| 2,608,717 | Kay | Sept. 2, 1952 |
| 2,615,841 | Thorp et al. | Oct. 28, 1952 |
| 2,777,957 | Walkup | Jan. 15, 1957 |

FOREIGN PATENTS

| 510,068 | Belgium | Apr. 15, 1952 |